(12) United States Patent
Liu et al.

(10) Patent No.: US 9,783,956 B2
(45) Date of Patent: Oct. 10, 2017

(54) BULLDOZER

(71) Applicant: SHANTUI CONSTRUCTION MACHINERY CO., LTD., Jining, Shandong (CN)

(72) Inventors: Chang'an Liu, Jining (CN); Yutian Jiang, Jining (CN); Xiangyang Li, Jining (CN); Jinliang Wang, Jining (CN); Dongxiao Yan, Jining (CN); Yajun Huang, Jining (CN); Linzhen Zhang, Jining (CN); Songshan Shi, Jining (CN); Jianjun Zhao, Jining (CN); Chao Jia, Jining (CN)

(73) Assignee: SHANTUI CONSTRUCTION MACHINERY CO., LTD., Jining, Shandong (CN)

( * ) Notice: Subject to any disclaimer, the term of this patent is extended or adjusted under 35 U.S.C. 154(b) by 54 days.

(21) Appl. No.: 14/895,483

(22) PCT Filed: Sep. 3, 2014

(86) PCT No.: PCT/CN2014/085807
§ 371 (c)(1),
(2) Date: Dec. 2, 2015

(87) PCT Pub. No.: WO2016/033748
PCT Pub. Date: Mar. 10, 2016

(65) Prior Publication Data
US 2016/0289921 A1 Oct. 6, 2016

(51) Int. Cl.
*B60K 13/00* (2006.01)
*B60K 11/00* (2006.01)
(Continued)

(52) U.S. Cl.
CPC ............ *E02F 9/0866* (2013.01); *B60K 13/04* (2013.01); *B60K 25/02* (2013.01); *E02F 3/76* (2013.01);
(Continued)

(58) Field of Classification Search
CPC ........ B60K 13/00; B60K 13/02; B60K 13/04; B60K 11/00; B60K 11/02; B60K 11/04; B60K 5/00
See application file for complete search history.

(56) References Cited

U.S. PATENT DOCUMENTS 8,505,661 B2 * 8/2013 Tsuji ..................... E02F 3/7609
180/68.4
2010/0187383 A1 7/2010 Olsen et al.
(Continued)

FOREIGN PATENT DOCUMENTS

CN 201695424 U 1/2011
CN 103374934 A 10/2013
(Continued)

OTHER PUBLICATIONS

PCT International Search Report, PCT/CN2014/085807, dated Dec. 31, 2014, 5 Pages.

*Primary Examiner* — Bryan Evans
(74) *Attorney, Agent, or Firm* — Fenwick & West LLP (57) ABSTRACT

A bulldozer according to the present application includes a main frame, and an engine, a hood and an exhaust after-treatment device are provided on the main frame, an air inlet of the exhaust after-treatment device is in communication with an air outlet of a turbine of the engine via a pipeline, and the exhaust after-treatment device is fixed to the hood. In the bulldozer, vibration generated by the engine is transmitted to the main frame through an engine supporting frame or a damping device, and then transmitted from the main frame to the hood, the transmission path of the (Continued)

vibration is long, thus the vibration damping becomes complicated and has a high damping value, and the vibration transmitted to the air cleaner is really small.

10 Claims, 6 Drawing Sheets

(51) Int. Cl.

| | | |
|---|---|---|
| *B60K 5/00* | (2006.01) | |
| *E02F 9/08* | (2006.01) | |
| *E02F 3/76* | (2006.01) | |
| *E02F 3/80* | (2006.01) | |
| *B60K 25/02* | (2006.01) | |
| *E02F 9/16* | (2006.01) | |
| *E02F 9/22* | (2006.01) | |
| *F01N 13/18* | (2010.01) | |
| *F02M 35/04* | (2006.01) | |
| *F02M 35/10* | (2006.01) | |
| *B60K 13/04* | (2006.01) | |

(52) U.S. Cl.
CPC .............. *E02F 3/7609* (2013.01); *E02F 3/80* (2013.01); *E02F 9/0891* (2013.01); *E02F 9/166* (2013.01); *E02F 9/22* (2013.01); *F01N 13/1822* (2013.01); *F01N 13/1855* (2013.01); *F02M 35/048* (2013.01); *F02M 35/10157* (2013.01); *B60K 2025/026* (2013.01); *B60Y 2200/411* (2013.01); *F01N 2340/04* (2013.01); *F01N 2590/08* (2013.01)

(56) References Cited

U.S. PATENT DOCUMENTS

2013/0277135 A1\* 10/2013 Sakai ................... E02F 9/0866
180/309
2014/0124285 A1   5/2014 Kimijima et al.

FOREIGN PATENT DOCUMENTS

| CN | 203230785 U | 10/2013 |
|---|---|---|
| CN | 103649422 A | 3/2014 |
| CN | 104153409 A | 11/2014 |
| JP | 5576583 B1 | 8/2014 |

\* cited by examiner

BULLDOZER

This application is the national phase of International Application No. PCT/CN2014/085807, titled "BULLDOZER", filed on Sep. 3, 2014, the entire disclosure of which is incorporated herein by reference.

TECHNICAL FIELD

The present application relates to the technical field of construction machinery, and particularly to a bulldozer.

BACKGROUND

Due to limitations of working conditions, vibration and noise of construction machinery are difficult to be eliminated. In the conventional technology, vibration damping is achieved generally by providing a damping mechanism and optimizing the structure of the damping mechanism, thus the design of damping mechanism has always been a key issue of the structural design of construction machineries such as a bulldozer.

Vibration of the bulldozer mainly arises from five aspects including a power system, a traveling system (road condition), a vehicle body structure, a hydraulic system and a cooling fan system. In the above five aspects, vibration caused in the acting of the engine in the power system is a main vibration source of the bulldozer, and, the vibration of a bulldozer with a power system using a diesel engine is more serious than a bulldozer with a power system using a gasoline engine. Hence, it is required to improve damping measures for components which are directly connected to the engine or indirectly connected to the engine via pipelines. Components directly connected to the engine mainly include a traveling hydraulic pump, a working hydraulic pump, and relevant gas pipes and oil pipes; and components connected to the engine via pipelines or the like mainly include an air cleaner, an exhaust after-treatment device or the like.

Currently, each of parts of the bulldozer in the conventional technology generally adopts a respective damping mechanism, for example, the air filtering device and the exhaust after-treatment device are fixed to the engine via respective damping components, and the damping components are used to reduce the adverse effects caused by vibration of the engine on the air filtering device or the like. However, this vibration decreasing effect is not satisfactory, and this arrangement increases the length of an exhaust pipeline, which in turn increases the resistance for discharging exhaust.

The traveling hydraulic pump and the working pump are arranged on a flywheel housing at a rear end of the engine, and dampers are arranged between the engine and the traveling hydraulic pump as well as between the engine and the working pump, the engine drives directly the hydraulic pump to work via the dampers, and the vibration of the engine is reduced by the dampers.

In addition, the vehicle body structure is formed by a mass of sheet-type parts by welding, this structure is apt to generate a new vibration source under the driving of the power system and the traveling system, damping of the engine and the hydraulic pump is performed independently, and the vibrations of the engine and the hydraulic pump are asynchronous, and especially when an intrinsic frequency and a vibration frequency of the engine are identical, resonance phenomena may occur, which not only is disadvantageous to the driving of the bulldozer, but also reduces the service life of the bulldozer greatly.

Therefore, an urgent technical issue to be addressed by the person skilled in the art is to optimize the structure of the bulldozer in the conventional technology, to effectively reduce adverse effects of vibration on various components and improve the service life and working performance of the components.

SUMMARY

An object of the present application is to provide a bulldozer having a structure which may effectively reduce adverse effects of vibration on various components and improve service life and working performance of the components.

In order to solve the above technical issues, a bulldozer is provided according to the present application, which includes a main frame, and an engine, a hood, and an exhaust after-treatment device are provided on the main frame, an air inlet of the exhaust after-treatment device is in communication with an air outlet of a turbine of the engine via a pipeline, wherein the exhaust after-treatment device is fixed to the hood.

Preferably, the hood includes an upper hood, a front hood, and two side guard plates, the engine is arranged inside a space enclosed by the upper hood, the front hood, the side guard plates and the main frame, and the exhaust after-treatment device is hanged to an inner wall of the upper hood located above the engine.

Preferably, the bulldozer further includes an air cleaner, wherein an air outlet of the air cleaner is in communication with an air inlet of a turbo charger of the engine, and the air cleaner is hanged to the inner wall of the upper hood.

Preferably, the air cleaner is located over the engine, and an axis of an air inlet pipe of the air cleaner is parallel to a horizontal plane of the bulldozer and is perpendicular to a center line of a crank of the engine.

Preferably, the bulldozer further includes a first hanger frame and a second hanger frame, wherein the exhaust after-treatment device and the air cleaner are arranged on the inner wall of the upper hood side by side and are connected to the inner wall of the upper hood via the first hanger frame and the second hanger frame respectively in an elastic vibration damping manner.

Preferably, the exhaust after-treatment device and the air cleaner are respectively in communication with the air outlet of the turbine and the air inlet of the turbo charger via flexible pipelines; and the flexible pipeline includes rigid pipe segments and at least one flexible pipe segment in communication with the rigid pipe segments.

Preferably, the bulldozer further includes an engine supporting frame, wherein the engine is supported on the main frame by the engine supporting frame, the bulldozer further includes a traveling hydraulic pump and a working pump, and each of the traveling hydraulic pump and the working pump is connected to an output shaft of the engine, and the traveling hydraulic pump and the working pump are rigidly connected to a housing of the engine.

Preferably, the traveling hydraulic pump and the working pump are fixed to a flywheel housing of the engine in series.

Preferably, a bottom portion of the engine supporting frame is provided with a plurality of dampers, and a gravity center of the engine and a geometrical center of the dampers are located in a same vertical axis, and the engine supporting frame is fixed to the main frame via the dampers.

Preferably, the first hanger frame includes a hanger frame body and a connecting bracket, the hanger frame body includes a bottom wall, a top wall and a side wall configured to connect the bottom wall and the top wall, and the exhaust after-treatment device is fixed to an inner wall of the bottom wall; the connecting bracket includes a supporting portion and a connecting portion, the supporting portion is configured to support an inner surface of the top wall via an elastic damping component, and the connecting portion is fixedly connected to the upper hood.

Preferably, the top wall is of a flat plate structure having an opening in a middle portion, the number of the connecting brackets is two, and the supporting portions of the two connecting brackets are configured to support and connect two end portions at a right side and a left side of the flat plate structure respectively.

Preferably, an inner surface of the bottom wall is provided with a supporting seat, and a supporting surface of the supporting seat is configured to cooperate with an outer surface of the exhaust after-treatment device, and the exhaust after-treatment device is bound and fixed to the supporting seat by a hoop.

Preferably, the second hanger frame includes a hanging plate and a connecting plate, the air cleaner is elastically fixed to a lower surface of the hanging plate via a damping component, an upper end portion of the hanging plate is provided with a plurality of connecting supports, and a lower end portion of the connecting plate is fixedly connected to the respective connecting support, and an upper surface of the connecting plate is fixedly connected to the upper hood.

The exhaust after-treatment device according to the present application is fixed to the hood. Specifically, the hood may include an upper hood, a front hood and two side guard plates. The engine is arranged inside a space enclosed by the upper hood, the front hood, the side guard plates, and the main frame. The exhaust after-treatment device is hanged on an inner wall of the upper hood over the engine.

The exhaust after-treatment device may be fixed to the upper hood of the hood via a four-point damping structure, and the pipeline connected to the engine may be a flexible pipeline, and the flexible pipeline may include rigid pipe segments, and at least one flexible pipe segment in communication with the rigid pipe segments. The flexible pipe segment has a damping function, and can absorb and reduce the vibration directly caused by the engine.

With the fixation manner in mounting the exhaust after-treatment device on the upper hood, the vibration generated by the engine is transmitted to the main frame through an engine supporting frame or a damping device, and then transmitted from the main frame to the front hood and the side guard hoods and finally transmitted to the upper hood, the transmission path of the vibration is long, thus the vibration damping becomes complicated and has a high damping value, and further due to the damping function of the four-point damping device, the vibration transmitted to the air cleaner is really small.

Further, vibration of the main frame caused by working of a blade working device will also be transmitted to the exhaust after-treatment device via the main frame, the hood, a damping component and etc. In this way, the transmission path of the vibration is long, and the adverse effects of the working vibration of the working device on the exhaust after-treatment device is also correspondingly reduced.

In addition, the exhaust after-treatment device is arranged on the upper hood, which will not additionally increase the width of the bulldozer. Although the manner of arranging the exhaust after-treatment device over the engine increases the height of the hood, the transverse width is not affected, thus the visual field of the driver at blade corners will not be affected.

Additionally, by arranging the exhaust after-treatment device on the upper hood, the length of an exhaust pipeline may be reduced and the arrangement of the pipelines is optimized, and the working reliability of the system is improved as well.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for the person skilled in the art, other drawings may be obtained based on these drawings without any creative efforts.

Corresponding relationships between reference numerals and components in FIGS. 1 to 6 are as follows:
1 main frame, 2 engine,
3 exhaust after-treatment device, 4 air cleaner,
5 working pump, 7 traveling hydraulic pump,
6 flexible pipeline, 21 upper hood,
22 front hood, 8 elastic damping component;
31 engine supporting beam, 32 supporting plate,
33 fixing plate, 41 hanger frame body,
411 bottom wall, 412 side wall,
413 top wall, 411a supporting seat,
413a opening, 421 first connecting bracket,
422 second connecting bracket, 43 vertical plate,
45 lower damping block, 46 upper damping block,
47 bolt, 44 hoop,
61 rigid pipe segment, 62 flexible pipe segment,
63 hoop, 64 rigid pipe segment,
4-1 bolt, 4-2 upper damping block,
4-3 lower damping block, 51 hanging plate,
52 connecting plate, 511 connecting vertical plate, and
53 connecting support.

DETAILED DESCRIPTION

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the scope of the present application.

An object of the present application is to provide a bulldozer having a structure which may effectively reduce adverse effects of vibration on various components and improve service life and working performance of the components.

For the skilled person in the art to better understand technical solutions of the present application, the present application is further described in detail with reference to the drawings and specific embodiments.

Figure 1:
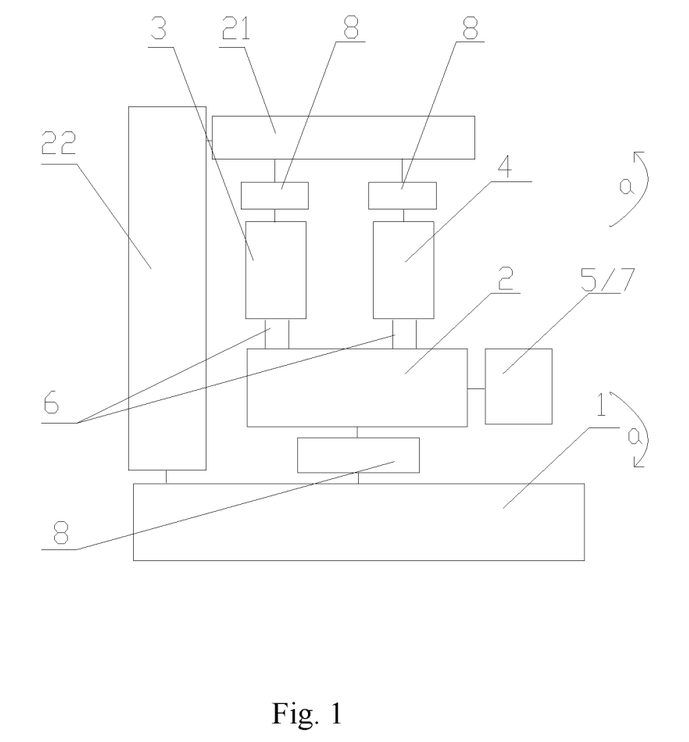
FIG. 1 is a block diagram showing the structure of a bulldozer according to an embodiment of the present application.
Figure 2:
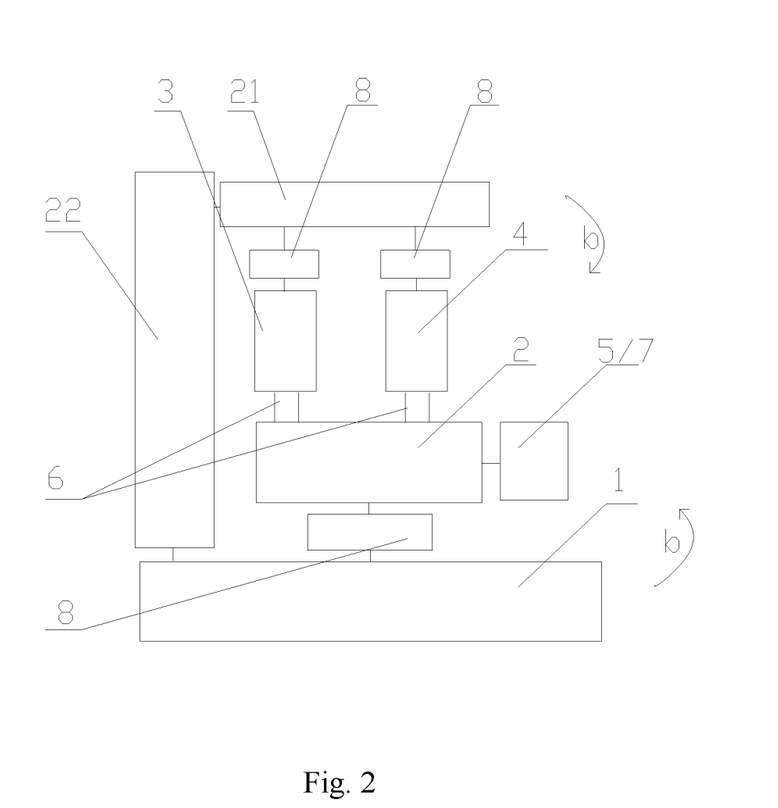
FIG. 2 is a schematic view showing the transmission of vibration of a main frame in the bulldozer according to an embodiment of the present application.

Reference is made to FIGS. 1 to 2, FIG. 1 is a block diagram showing the structure of a bulldozer according to an embodiment of the present application, and FIG. 2 is a schematic view showing the transmission of vibration of a main frame in the bulldozer according to an embodiment of the present application.

The bulldozer according to the present application includes a main frame 1, and an engine 2, a hood and an exhaust after-treatment device 3 are provided on the main frame 1, the hood mainly functions to protect the engine 2, and the engine 2 is generally arranged inside a space enclosed by the hood and the main frame 1. An air inlet of the exhaust after-treatment device 3 is in communication with an air outlet of a turbine of the engine 2 via a pipeline.

The exhaust after-treatment device 3 according to the present application is fixed to the hood. The hood may include an upper hood 21, a front hood 22 and two side guard plates. The engine 2 is arranged inside a space enclosed by the upper hood 21, the front hood 22, the side guard plates, and the main frame 1. The exhaust after-treatment device 3 is hanged on an inner wall of the upper hood 21 over the engine 2.

The exhaust after-treatment device 3 may be fixed to the upper hood 21 of the hood via a four-point damping structure, and the pipeline connected to the engine 2 may be a flexible pipeline 6. The flexible pipeline 6 may include rigid pipe segments 61, 64 and at least one flexible pipe segment 62 in communication with the rigid pipe segments 61, 64. The flexible pipe segment 62 has a damping function, and can absorb and reduce the vibration directly caused by the engine 2. The flexible pipe segment 62 and the rigid pipe segment 61 may be fixed by a hoop 63, and the rigid pipe segment 63 and the inlet of the exhaust after-treatment device may also be fixedly connected via a hoop 63.

The transmission direction of the vibration generated by the engine 2 is indicated by an arrow a in FIG. 1. With the fixation manner in mounting the exhaust after-treatment device 3 on the upper hood 21, the vibration generated by the engine 2 is transmitted to the main frame 1 through an engine supporting frame or a damping device, and then transmitted from the main frame 1 to the front hood 22 and the side guard hoods and finally transmitted to the upper hood 21, the transmission path of the vibration is long, thus the vibration damping becomes complicated and has a high damping value, and further due to the damping function of the four-point damping device, the vibration transmitted to the air cleaner 4 is really small.

Further, vibration of the main frame 1 caused by working of a blade working device will also be transmitted to the exhaust after-treatment device via the main frame 1, the hood, a damping component and etc. The transmission direction of the vibration of the main frame 1 is indicated by an arrow b in FIG. 2. In this way, the transmission path of the vibration is long, and the adverse effects of the working vibration of the working device on the exhaust after-treatment device 3 is also correspondingly reduced.

In addition, the exhaust after-treatment device 3 is arranged on the upper hood 21, which will not additionally increase the width of the bulldozer. Although the manner of arranging the exhaust after-treatment device 3 over the engine 2 increases the height of the hood, the transverse width is not affected, thus the visual field of the driver at blade corners will not be affected.

Additionally, by arranging the exhaust after-treatment device on the upper hood 21, the length of an exhaust pipeline may be reduced and the arrangement of the pipelines is optimized, and the working reliability of the system is improved as well.

Taking a diesel engine 2 as an example, the engine 2 is equipped with a turbo charger, and the bulldozer further includes an air cleaner 4. An air outlet of the air cleaner 4 is in communication with an air inlet of the turbo charger of the engine 2, thereby forming a power device for the exhaust of the engine 2. The exhaust drives the turbo charger to rotate, and then enters into the exhaust after-treatment device 3 from a left side, is treated therein and then discharged via a discharging funnel connected to a right side of the exhaust after-treatment device 3.

In this embodiment, the air cleaner 4 is hanged on the inner wall of the upper hood 21, and the air cleaner 4 may be fixed to the upper hood 21 via a four-point damping structure. The pipelines connected to the engine 2 may each be provided with a flexible segment for damping, to absorb and reduce the vibration caused directly by the engine 2. With the fixation manner in mounting the air cleaner 4 on the upper hood 21, the vibration generated by the engine 2 is transmitted to the main frame 1 through a damping device of the engine 2, and then transmitted from the main frame 1 to the front hood 22 and the side guard hoods, and finally to the upper hood 21, the transmission path of the vibration is long, thus the vibration damping becomes complicated and has a high damping value, and further due to the damping function of the four-point damping device, the vibration transmitted to the air cleaner 4 is really small.

In a specific embodiment, the air cleaner 4 may be located over the engine 2, and an axis of an air inlet pipe of the air cleaner is parallel to a horizontal plane of the bulldozer, and the axis of the air inlet pipe is perpendicular to a center line of a crank of the engine 2. This arrangement manner may optimize the connection of the pipelines between the engine 2 and the air cleaner 4.

In a specific embodiment, the bulldozer according to the present application further includes a first hanger frame and a second hanger frame. The exhaust after-treatment device 3 and the air cleaner 4 are arranged on the inner wall of the upper hood 21 side by side, and are connected to the inner wall of the upper hood 21 via the first hanger frame and the second hanger frame respectively in an elastic vibration damping manner.

The structure of the first hanger frame and the second hanger frame may be variously designed, and a specific structure of the first hanger frame and the second hanger frame is described hereinafter.

Figure 4:
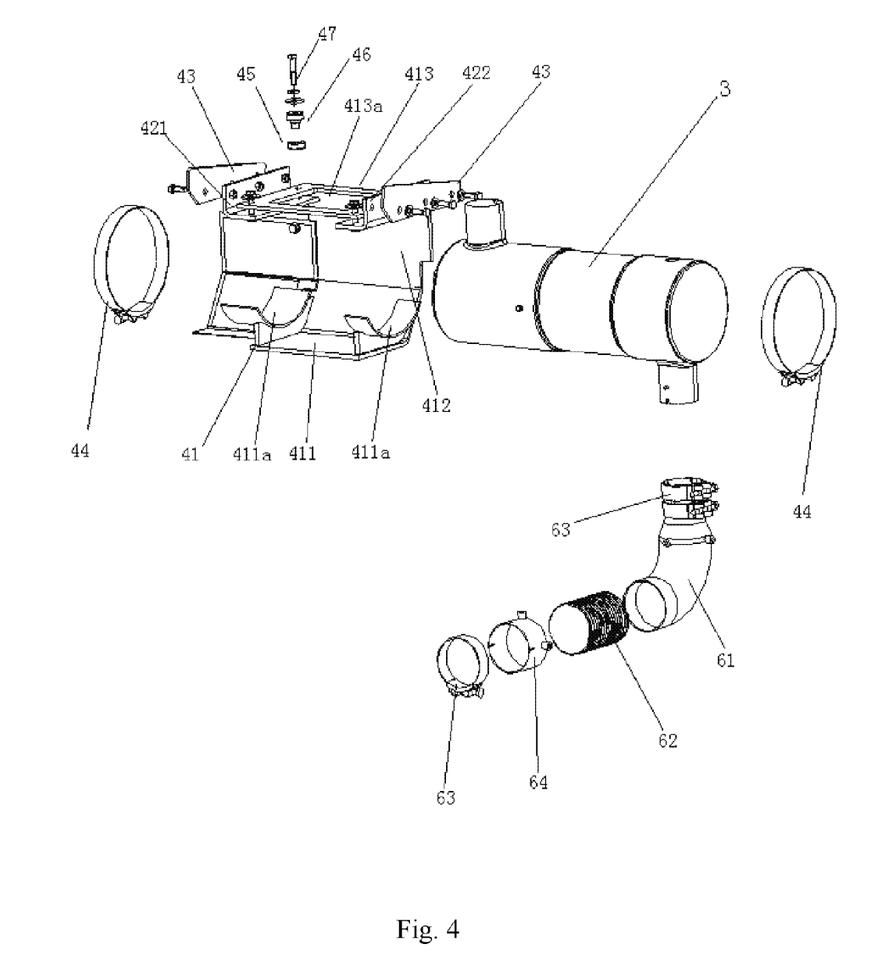
FIG. 4 is an exploded schematic view showing an exhaust after-treatment device and its fixing device according to an embodiment of the present application.

Reference is made to FIG. 4, which is an exploded schematic view showing an exhaust after-treatment device and its fixing device according to an embodiment of the present application.

In a specific embodiment, the first hanger frame may include a hanger frame body 41 and a connecting bracket. The hanger frame body 41 includes a bottom wall 411, a top wall 413, and a side wall 412 configured to connect the bottom wall 411 to the top wall 413, and the exhaust after-treatment device 3 is fixed to an inner surface of the bottom wall 411. The connecting bracket includes a supporting portion and a connecting portion, the supporting portion is configured to support an inner surface of the top wall 413 via an elastic damping component 8, and the connecting portion is fixedly connected to the upper hood 21. The connecting bracket and the top wall 413 may be fixed by a bolt 47.

In this embodiment, the exhaust after-treatment device 3 is arranged on the bottom wall 411 of the hanger frame body 41, and the hanger frame body 41 is fixedly connected to the upper hood 21 via the connecting bracket. The vibration transmitted from the upper hood 21 passes through the connecting bracket, the hanger frame body 41 and the elastic damping component 8, and then is transmitted to the exhaust after-treatment device 3. In this way, the vibration may be further reduced, and the service life and working reliability of the exhaust after-treatment device 3 may be further improved.

Further, the top wall 413 of the hanger frame body 41 may be of a flat plate structure having an opening 413 in a middle portion, and the number of the connecting brackets is two. For simplicity of description of the technical solution, the two connecting brackets are defined as a first connecting bracket 421 and a second connecting bracket 422 herein, and the supporting portions of the first connecting bracket 421 and the second connecting bracket 422 are respectively configured to support and connect a left end portion and a right end portion of the flat plate structure. The connecting portions of the first connecting plate 421 and the second connecting plate 422 may be connected directly to the upper hood 21 or indirectly to the upper hood 21 via a third member, and as shown in the drawings, the two connecting brackets are respectively fixedly connected to the upper hood 21 via vertical plates 43.

The number of the elastic damping component 8 may be one or two. There are two elastic damping components 8 provided in the drawing, which are respectively an upper damping block 45 and a lower damping block 46, and the upper damping block 45 and the lower damping block 46 are respectively arranged at an inner side and an outer side of the top wall 413.

In the above embodiments, the inner surface of the bottom wall 411 may be provided with a supporting seat 411*a*. A supporting surface of the supporting seat 411*a* cooperates with an outer surface of the exhaust after-treatment device 3, and the exhaust after-treatment device 3 is bound and fixed to the supporting seat 411*a* by a hoop 44. This fixation manner is simple and reliable.

Figure 5:
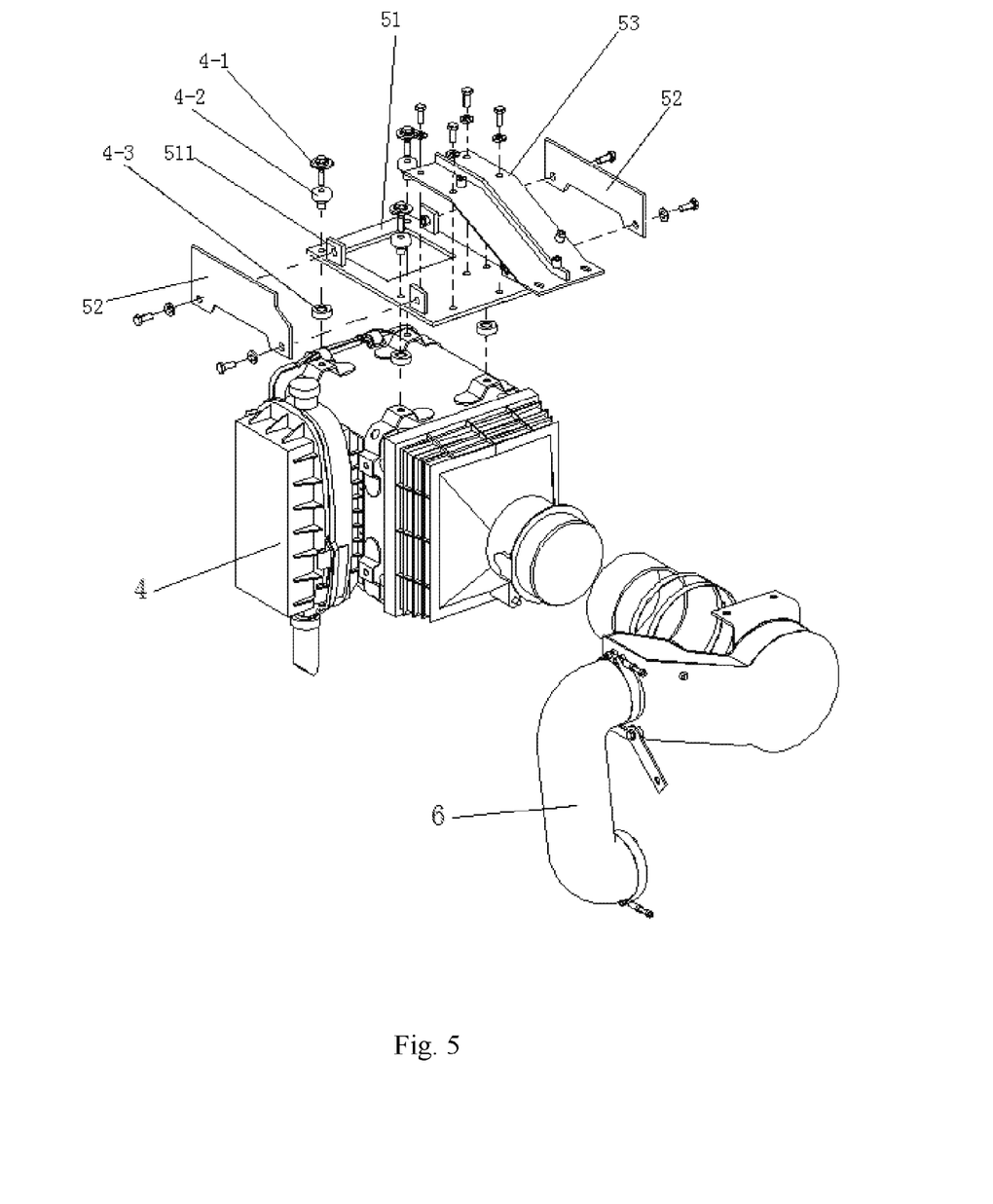
FIG. 5 is an exploded schematic view showing an air cleaner and its fixing device according to an embodiment of the present application.
Figure 6:
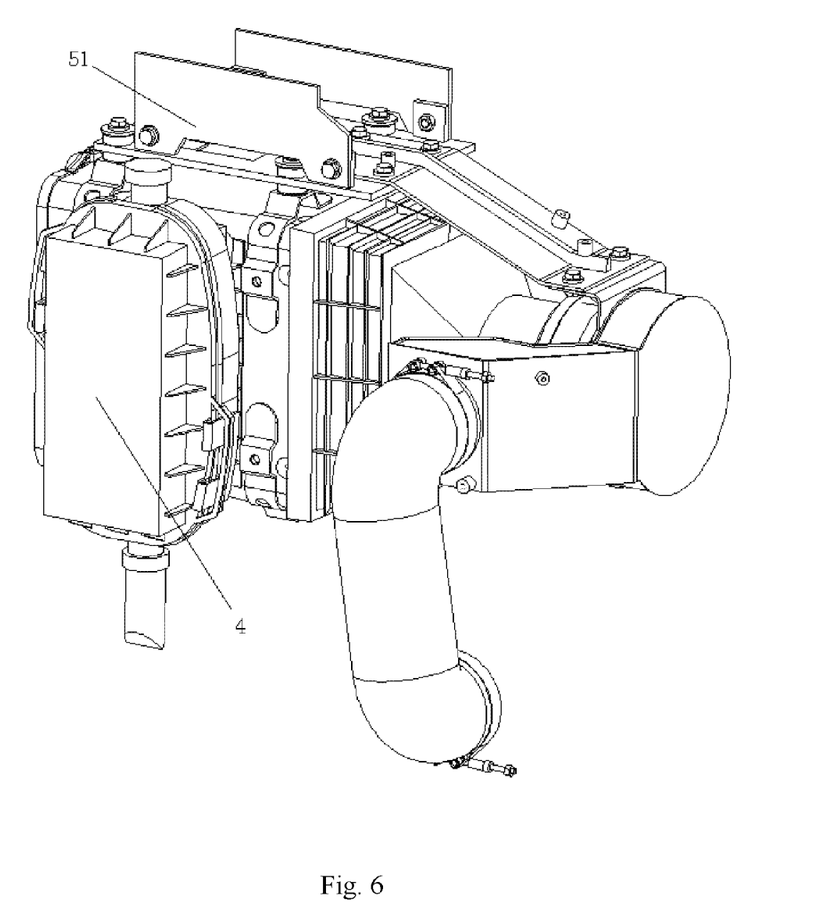
FIG. 6 is an overall view showing the structure of the air cleaner and its fixing device shown in FIG. 5.

Reference is made to FIGS. 5 to 6, FIG. 5 is an exploded schematic view showing an air cleaner and its fixing device according to an embodiment of the present application, and FIG. 6 is an overall view showing the structure of the air cleaner and its fixing device as shown in FIG. 5.

The second hanger frame according to the above embodiments may include a hanging plate 51 and a connecting plate 52. The air cleaner 4 is elastically fixed to a lower surface of the hanging plate 51 via an elastic damping component, and an upper surface of the hanging plate 51 is provided with several connecting supports 53. A lower end portion of the connecting plate 52 is fixedly connected to the respective connecting support 53, and an upper surface of the connecting plate 52 is fixedly connected to the upper hood 21. The connecting support 53 may be embodied as a vertical plate. The lower end portion of the connecting plate 52 and the connecting vertical plate 511 may each be provided with through holes, and a bolt 4-1 passes through the through holes to fix the connecting plate 52 and the connecting support 53. An upper end portion of the connecting plate may be fixed to the upper hood 21 by welding or the bolt 4-1. Similarly, the elastic damping component may include an upper damping block 4-2 and a lower damping block 4-3.

Apparently, the connection manner between the connecting plate and the connecting support and the connection manner between the connecting plate and the upper hood 21 are not limited to the manners described herein, and can be any manner as long as a reliable fixation therebetween can be achieved.

In the above embodiments, the engine 2 is supported on the main frame 1 by an engine supporting frame, and the bulldozer further includes a traveling hydraulic pump 7 and a working pump 5, the traveling hydraulic pump 7 and the working pump 5 are both connected to an output shaft of the engine 2, and the traveling hydraulic pump 7 and the working pump 5 are rigidly connected to a housing of the engine 2.

Compared with the conventional technology in which the engine 2, the traveling hydraulic pump 7 and the working pump 5 are fixed to the main frame 1 individually, in this embodiment, the engine 2, the traveling pump, the working pump 5 are rigidly connected to form a whole and then supported on the main frame 1 via the engine supporting frame. In this way, the integral damping structure for the engine 2, the traveling hydraulic pump 7 and the working pump 5 has an identical vibration frequency, and may effectively improve the overall rigidity of the hydraulic pump, and reduce the magnitude of the vibration caused by the engine 2, which also improves the service life of the hydraulic pump, facilitates the drive of the bulldozer, and improves the service life of the bulldozer.

Figure 3:
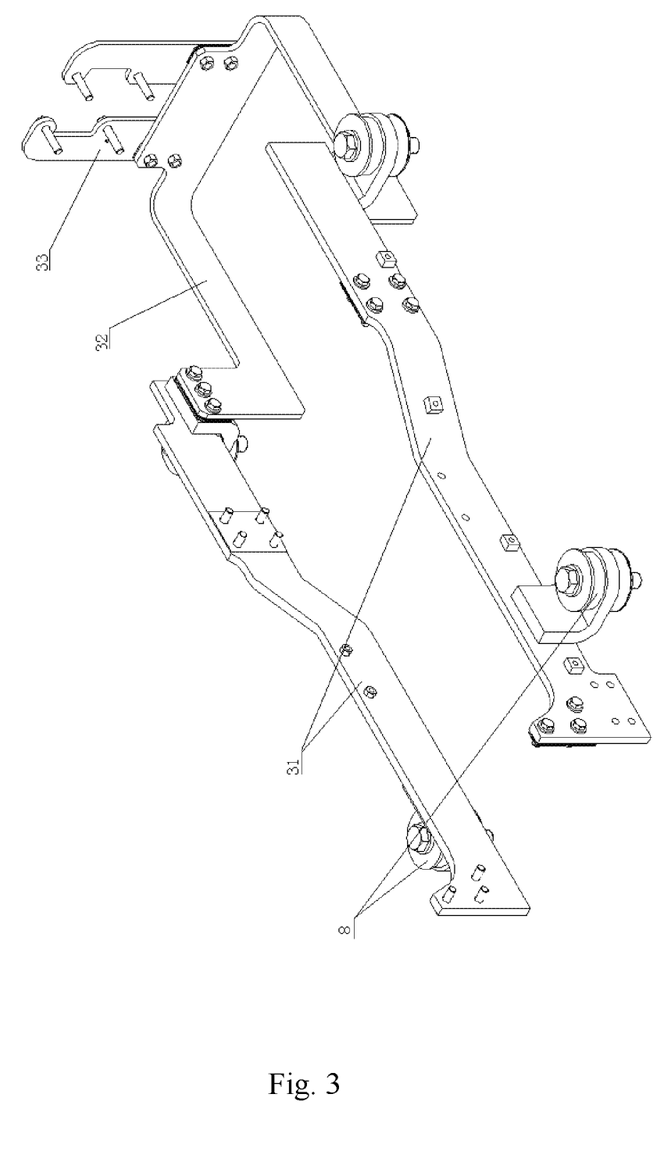
FIG. 3 is a schematic view showing the structure of an engine supporting frame according to an embodiment of the present application.

Reference is made to FIG. 3, which is a schematic view showing the structure of an engine supporting frame according to an embodiment of the present application.

Specifically, the engine supporting frame may include engine supporting beams 31 arranged symmetrically at right and left sides, and two supporting plates 32 for connecting the two engine supporting beams 31. The two supporting plates 32 are configured to support the working pump 5 and the traveling hydraulic pump 7. A fixing plate 33 may be further provided to fix a right end portion of the pump. The elastic damping component 8 is arranged at a lower portion of each of the engine supporting beams 31.

The traveling hydraulic pump 7 and the working pump 5 may be embodied as a serial-type dual hydraulic pump, and may also be embodied as a triple hydraulic pump.

For better reducing adverse effects of the vibration on the operation of the engine 2 and the components such as the working pump 5, multiple dampers are uniformly arranged at a bottom portion of the engine supporting frame, and the engine supporting frame is fixed to the main frame 1 via the dampers.

The specific structure of the engine supporting frame may be embodied as the structure shown in FIG. 3. Firstly, a supporting seat of the engine 2 is connected to the engine 2 by bolts, and the dual traveling hydraulic pump 7 rotates along with the engine 2 and a coupling via a spline, a working hydraulic pump is located behind the traveling hydraulic pump 7, and is connected to the traveling hydraulic pump 7 via a spline. The supporting seat (as shown in FIG. 4) of the engine 2 fastens the engine 2, the traveling hydraulic pump 7 and the working hydraulic pump to form a whole via the vertical plates at the rear side, and the formed whole is then mounted on the main frame 1 via a damping device. The damping device may be a four-point damping device, in which two sides of the engine 2 are each provided with two dampers symmetrically arranged. In a specific embodiment, a right-side front-end damper is located 30 cm behind a front end surface of the engine 2, and a right-side rear-end damper is located in a middle position of the traveling hydraulic pump 7. The four-point dampers are arranged uniformly according to a gravity center of the whole of the engine 2 and the hydraulic pumps. The four-point damper may include an upper damping block and a lower damping block, and each of the damping blocks may be made by an elastic material such as rubber, and may be of a cylinder shape with a through hole in the middle for a bolt to pass through. The upper damping block and the lower damping block are respectively mounted to an upper surface and a lower surface of the engine supporting frame, and are connected to the main frame 1 via bolts.

The traveling hydraulic pump 7 and the working pump 5 are fixed to a flywheel housing of the engine 2 in series.

Reference may be made to documents of the conventional technology for the structures of other aspects of the bulldozer, which will not be described herein.

A bulldozer according to the present application is described in detail hereinbefore. The principle and the embodiments of the present application are illustrated herein by specific examples. The above description of examples is only intended to help the understanding of the method and the spirit of the present application. It should be noted that, for the person skilled in the art, a few of modifications and improvements may be made to the present application without departing from the principle of the present application, and these modifications and improvements are also deemed to fall into the scope of the present application defined by the claims.

The invention claimed is:

1. A bulldozer, comprising a main frame, and an engine, a hood, and an exhaust after-treatment device being provided on the main frame, an air inlet of the exhaust after-treatment device being in communication with an air outlet of a turbine of the engine via a pipeline, wherein the exhaust after-treatment device is fixed to the hood;

wherein the hood comprises an upper hood, a front hood, and two side guard plates, the engine is arranged inside a space enclosed by the upper hood, the front hood, the side guard plates and the main frame, and the exhaust after-treatment device is hanged to an inner wall of the upper hood located above the engine;

wherein the bulldozer further comprises an air cleaner, wherein an air outlet of the air cleaner is in communication with an air inlet of a turbo charger of the engine, and the air cleaner is hanged to the inner wall of the upper hood; and wherein the air cleaner is located over the engine, and an axis of an air inlet pipe of the air cleaner is parallel to a horizontal plane of the bulldozer and is perpendicular to a center line of a crank of the engine.

2. The bulldozer according to claim 1, further comprising a first hanger frame and a second hanger frame, wherein the exhaust after-treatment device and the air cleaner are arranged on the inner wall of the upper hood side by side and are connected to the inner wall of the upper hood via the first hanger frame and the second hanger frame respectively in an elastic vibration damping manner.

3. The bulldozer according to claim 1, wherein the exhaust after-treatment device and the air cleaner are respectively in communication with the air outlet of the turbine and the air inlet of the turbo charger via flexible pipelines; and the flexible pipeline comprises rigid pipe segments and at least one flexible pipe segment in communication with the rigid pipe segments.

4. The bulldozer according to claim 1, further comprising an engine supporting frame, wherein the engine is supported on the main frame by the engine supporting frame, the bulldozer further comprises a traveling hydraulic pump and a working pump, and each of the traveling hydraulic pump and the working pump is connected to an output shaft of the engine, and the traveling hydraulic pump and the working pump are rigidly connected to a housing of the engine.

5. The bulldozer according to claim 4, wherein the traveling hydraulic pump and the working pump are fixed to a flywheel housing of the engine in series.

6. The bulldozer according to claim 4, wherein a bottom portion of the engine supporting frame is provided with a plurality of dampers, and a gravity center of the engine and a geometrical center of the dampers are located in a same vertical axis, and the engine supporting frame is fixed to the main frame via the dampers.

7. The bulldozer according to claim 2, wherein the first hanger frame comprises a hanger frame body and a connecting bracket, the hanger frame body comprises a bottom wall, a top wall and a side wall configured to connect the bottom wall and the top wall, and the exhaust after-treatment device is fixed to an inner wall of the bottom wall; the connecting bracket comprises a supporting portion and a connecting portion, the supporting portion is configured to support an inner surface of the top wall via an elastic damping component, and the connecting portion is fixedly connected to the upper hood.

8. The bulldozer according to claim 7, wherein the top wall is of a flat plate structure having an opening in a middle portion, the number of the connecting brackets is two, and the supporting portions of the two connecting brackets are configured to support and connect two end portions at a right side and a left side of the flat plate structure respectively.

9. The bulldozer according to claim 7, wherein an inner surface of the bottom wall is provided with a supporting seat, and a supporting surface of the supporting seat is configured to cooperate with an outer surface of the exhaust after-treatment device, and the exhaust after-treatment device is bound and fixed to the supporting seat by a hoop.

10. The bulldozer according to claim 2, wherein the second hanger frame comprises a hanging plate and a connecting plate, the air cleaner is elastically fixed to a lower surface of the hanging plate via a damping component, an upper surface of the hanging plate is provided with a plurality of connecting supports, and a lower end portion of the connecting plate is fixedly connected to the connecting support, and an upper end portion of the connecting plate is fixedly connected to the upper hood.

* * * * *